Sept. 22, 1964 T. GONDA 3,150,336

COUPLING BETWEEN AND THROUGH STACKED CIRCUIT PLANES BY MEANS OF ALIGNED WAVEGUIDE SECTIONS

Filed Dec. 8, 1960 4 Sheets-Sheet 1

Sept. 22, 1964 T. GONDA 3,150,336

COUPLING BETWEEN AND THROUGH STACKED CIRCUIT PLANES BY MEANS OF ALIGNED WAVEGUIDE SECTIONS

Filed Dec. 8, 1960 4 Sheets-Sheet 2

3,150,336

COUPLING BETWEEN AND THROUGH STACKED CIRCUIT PLANES BY MEANS OF ALIGNED WAVEGUIDE SECTIONS

Tibor Gonda, New York, N.Y., assignor to International Business Machines Corporation, New York, N.Y., a corporation of New York Filed Dec. 8, 1960, Ser. No. 74,724
5 Claims. (Cl. 333—33)

This invention relates to coupling elements for interconnecting transmission line structures and more particularly to devices for connecting strip transmission line circuits lying in different planes.

The terms "strip transmission line" or "strip line" will be used herein to designate an electric circuit or line for which a strip of thin metal or foil comprises one conductor of the circuit or line. In the form illustrated herein, the strip line comprises a sandwich-type transmission line having two metallic ground plates in spaced parallel relationship to each other with a dielectric material, preferably a solid or porous solid material, filling the space between the plates. Supported by the dielectric material between and spaced from the plates there are provided one or more strips of thin metal or foil arranged in a pattern constituting the inner conductor of an electric circuit, wiring scheme, transmission line, delay line, or other electrical network of which the pair of ground plates constitutes the second or outer conductor. The field associated with any individual strip is confined closely to the immediate neighborhood of the strip so that adjacent strips may be made substantially independent of each other by suitable lateral separation. Accordingly, large composite circuits may be contained between a single pair of ground plates.

In another form of strip line, commonly called "microstrip," the strip is supported in spaced relationship to a single ground plate.

In case the physical size of a strip line circuit becomes inconveniently large or unwieldy, the circuit may be divided up into sections, sometimes referred to herein as circuit planes, which may be stacked to form a compact whole. In a divided or stacked arrangement or array it may be necessary to have means for electrically connecting circuit points lying in different divisions of the circuit, which points may lie in different planes. A coupler for making such a connection between points lying in different circuit planes will sometimes be referred to herein as a circuit plane coupler.

The usual type of wave which propagates freely in a strip line circuit is a TEM-type wave, similar electrically to the TEM-type wave in a coaxial transmission line.

An object of the invention is to facilitate and simplify the manufacture, maintenance and repair of strip line circuits or the like, and particularly of circuits comprised in a plurality of parallel planes.

Another object is to economize on storage space required by a composite electric circuit.

A further object is to promote compactness in an electric wave transmission structure.

A still further object is to promote ready interchangeability of circuit planes in a stacked array of such planes.

A feature of the invention is the elimination of any requirement for direct mechanical connection between circuit planes.

Another feature is the use of a segmental hollow-pipe waveguide formed of aligned segments each of which is embedded in a different circuit plane in a stack of such planes.

Another feature is a right angle coupling between a sandwich-type transmission line and a hollow-pipe waveguide embedded in a stack of similar sandwich-type transmission lines. More particularly, the coupling employs a restricted opening interconnecting the respective interior spaces of the line and waveguide together with a reflectively terminated conductive inner strip in the sandwich-type line arranged opposite and adjacent to the interconnecting opening.

Still another feature is the use of a plurality of embedded waveguides to interconnect a plurality of pairs of points in different circuit planes in a stacked array.

In certain illustrative embodiments of the invention described and shown herein, electrical connections between points in different planes are made by way of combinations of short lengths of waveguide not mechanically connected to each other. Each such length or section of waveguide is inserted only in a single circuit plane and lies within or flush with the physical boundaries of that circuit plane. Therefore, any circuit plane in a stack can be removed from the stack without mechanically disconnecting one circuit plane from another. A plurality of waveguide sections which together jointly form a single electrical path from one circuit plane to another are arranged in axial alignment or register so as to form the substantial electrical equivalent of a continuous waveguide, it having been found that the difference in transmission properties between a continuous waveguide and a segmental waveguide composed of adjacent short sections in register is not significant even though the sections are not mechanically connected together, and this is true whether the adjacent sections do or do not touch one another. Connection from the waveguide to a selected point in a circuit plane is made by means of a waveguide-strip line transition or coupling of a special type taking into account the physical relationship of the waveguide and the circuit planes near the point of connection.

Other features, objects and advantages will appear from the following more detailed description of an illustrative embodiment of the invention, which will now be given in conjunction with the accompanying drawings.

Figure 1:
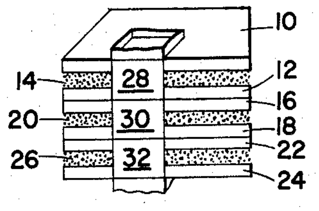
FIG. 1 is a fragmentary perspective view of a segmental waveguide passing through registering slots in a stack of sandwich-type circuit planes.

FIG. 1 shows, in perspective, a plurality of stacked sandwich-type circuit planes together with a sectionalized (segmental) waveguide passing through the circuit planes by way of registering slots cut through the respective circuit planes. The upper circuit plane in the figure comprises top and bottom ground plates 10 and 12 respectively, with an intermediate layer 14 of dielectric material. It will be understood that pieces of metal strip or foil are embedded in the dielectric layer 14 in any desired configuration to form an electrical circuit or a portion of such a circuit. Below the upper circuit plane are shown two lower circuit planes comprising respectively ground plates 16, 18 with intermediate layer 20, and ground plates 22, 24 with intermediate layer 26. Passing through a slot in the upper circuit plane is located a waveguide section 28 of axial length equal to the sum of the thicknesses of the ground plates 10 and 12 and of the intermediate layer 14. Similar waveguide sections 30 and 32 pass through registering slots in the respective lower circuit planes as shown, the waveguide sections 28, 30, 32 together forming the electrical equivalent of a single section of waveguide of length equal to the combined thickness of three circuit planes. The waveguide so formed passes through the three circuit planes of the figure in substantially complete isolation from whatever electrical circuits are contained in the circuit planes, and may be extended upwardly and downwardly through as many additional circuit planes as desired. Preferably, each waveguide section is mechanically fastened and electrically grounded to the respective circuit plane by being closely fitted within the slot in the circuit plane, and, if desired, the connections may be made more secure by welding or brazing the waveguide section to the ground plates of the circuit plane. The waveguide sections are hollow and have walls with conductive inner surfaces. In the form illustrated, the sections 28, 30 and 32 are in the form of short lengths of hollow metal pipes.

The slot for receiving the waveguide section need not be at the edge of the circuit plane, where it is shown for clarity in FIG. 1, but may be placed in any available portion of the circuit plane. It will be evident that in a given stack of circuit planes space for a waveguide section must be left free of circuit elements in a corresponding or registering position in each circuit plane through which the waveguide connection is required to pass.

Figures 2, 3:
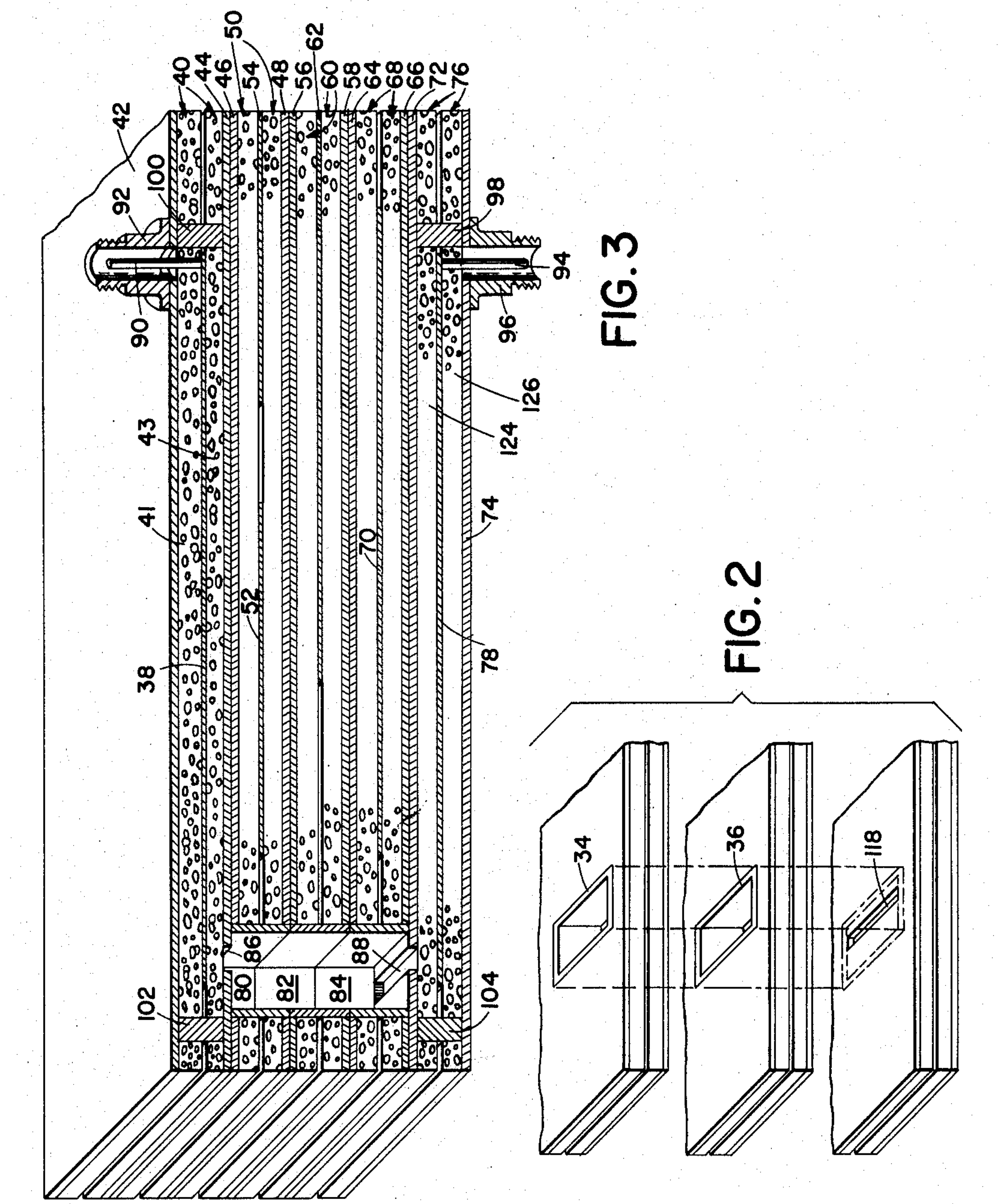
FIG. 2 is an exploded perspective view of portions of three circuit planes representing part of a stack of interconnected circuit planes.
FIG. 3 is a cross-sectional perspective view of a stack of circuit planes, showing an input coaxial line to strip line transition, strip line to waveguide transitions and an output strip line to coaxial line transition, together with several strip lines not interconnected through the waveguide.

FIG. 2 shows registering waveguide sections 34 and 36 in two adjacent circuit planes. In this view, the circuit planes are shown separated in exploded view to bring out the fact that each waveguide section may be fastened to and form an integral part of the circuit plane with which it is associated, having no mechanical connection with any other circuit plane. FIG. 2 also emphasizes the fact that, because of the absence of mechanical connection between circuit planes, any circuit plane may easily be removed from the stack for maintenance or repair, or circuit planes having registering waveguide slots may be interchanged.

FIG. 3 shows, in cross-section and perspective, an illustrative stack of five circuit planes, with first coupling means connected to the top plane and second coupling means connected to the bottom plane, together with a circuit plane coupler connecting points in the top and bottom planes.

In the uppermost circuit plane there is shown a strip or foil conductor 38 embedded in a dielectric filling 40 which may include an upper layer 41 and a lower layer 43 between ground plates 42 and 44. Additional conductors are shown in the lower dielectric fillings, all of which conductors may comprise parts of circuits or parts of one or more composite circuits. Each composite circuit may extend into two or more circuit planes. For purposes of illustration, the second circuit plane down from the top is shown with ground plates 46, 48, intermediate dielectric filling 50, and conductors 52 and 54. The third circuit plane is shown with ground plates 56, 58, intermediate filling 60 and conductor 62. The fourth circuit plane has ground plates 64, 66, intermediate filling 68 and conductor 70. The bottom circuit plane has ground plates 72, 74, intermediate filling 76 and conductor 78. A waveguide section 80 is embedded in the second circuit plane, and waveguide sections 82, 84 are embedded in alignment with the section 80 in the third and fourth circuit planes respectively.

The waveguide section 80 is coupled to the top circuit plane and particularly to the conductor 38 through a slot 86 in the ground plate 44 near the lefthand end of the conductor 38. The waveguide section 84 is similarly coupled to the bottom circuit plane and particularly to the conductor 78 through a slot 88 in the ground plate 72 near the lefthand end of the conductor 78.

The righthand end of the conductor 38 is shown connected to the central conductor 90 of a conventional coaxial terminal, the outer conductor 92 of which is mounted upon and electrically connected to the ground plate 42. The righthand end of conductor 78 is shown similarly connected to the central conductor 94 of another coaxial terminal, the outer conductor 96 of which is mounted upon and electrically connected to the ground plate 74. A portion of a transition member 98 appears in cross-section adjacent to the righthand end of conductor 78 and the upper end of conductor 94. A portion of a similar transition member 100 appears in cross-section adjacent to the righthand end of conductor 38 and the lower end of conductor 90. Portions of wave reflectors 102 and 104 appear in cross-section near the lefthand ends of conductors 38 and 78 respectively. The members 98, 100, 102, 104 serve the additional purpose of spacers for determining the desired spacing between upper and lower ground plates in the respective circuit planes. It will be assumed that additional spacers will be provided so that each circuit plane will have its ground plates properly spaced. Conventional means (not shown) may be provided for holding the circuit planes in registered stacked relationship which means may be readily releasable to facilitate removal and repacement of any circuit plane in the stack as required.

Figure 4:
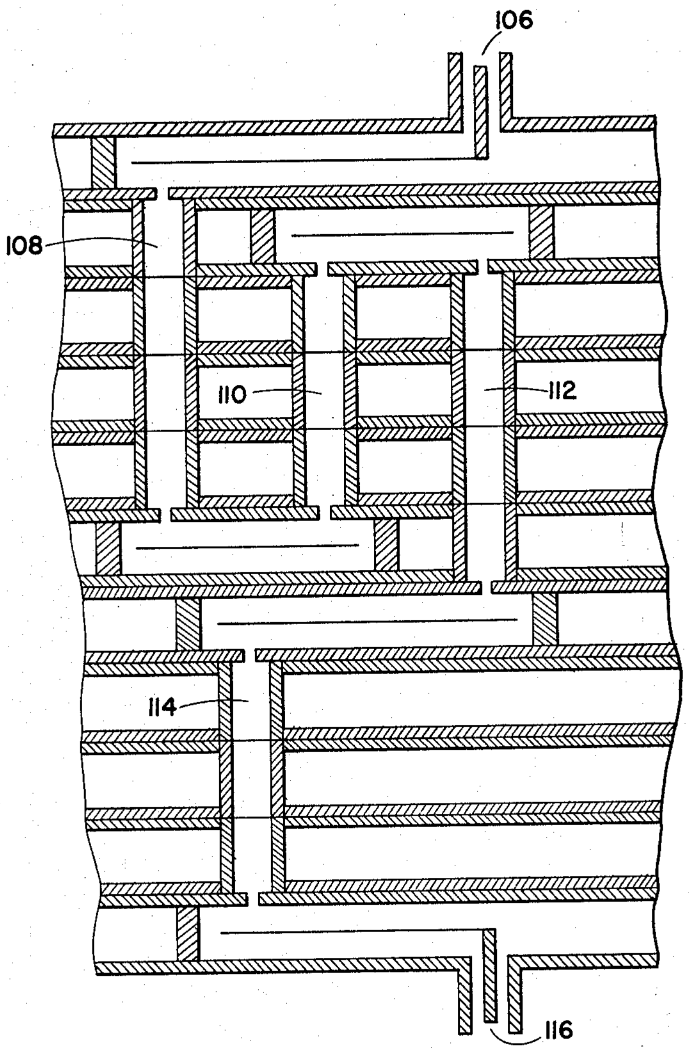
FIG. 4 is a diagram showing a stack of eleven circuit planes some of which planes are interconnected by waveguides, together with input and output connections to the set of interconnected planes.

FIG. 4 shows in diagrammatic form a somewhat more complex system of circuit plane connections wherein there are eleven circuit planes in all, of which five are interconnected by way of example. An input connection 106 is shown connecting into the top circuit plane. A segmental waveguide 108 is shown coupling the top plane to the sixth plane down. A waveguide 110 connects the sixth plane to the second plane; a waveguide 112 connects the second plane to the seventh plane; and a waveguide 114 connects the seventh plane to the eleventh plane. An output connection 116 is shown connected out from the eleventh plane.

The coupling between the strip line conductor in a circuit plane and the waveguide coupler running from one circuit plane to another is of a special type conformable to the physical configuration of the circuit plane and the waveguide structure, especially when, as in the general case, the waveguide extends on one side only of the circuit plane to which it is to be connected. Examples of cases in which only one side of a given circuit plane is available for connecting to a waveguide are illustrated by waveguides 110, 112 in FIG. 4.

Figure 5:
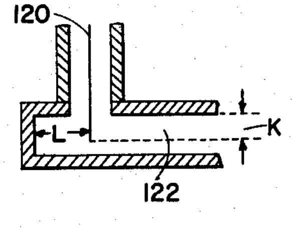
FIG. 5 is a diagram of a conventional strip line to waveguide transition for comparison with the transitions illustrated in certain of the other figures.

FIG. 5 shows a conventional transition or coupling between a waveguide and a TEM-wave structure such as strip line or coaxial cable. In this form of coupler, the inner conductor of the TEM-type structure is extended as a probe into the interior of the waveguide, as in FIG. 5, wherein the inner conductor 120 extends into the waveguide 122. For effecting an impedance match between dissimilar transmission lines, two matching parameters are generally required. One of these in the arrangement of FIG. 5 is the extent of penetration K of the probe into the waveguide, and the other is the location of a short circuit or reflecting member at a distance L behind the probe, as indicated in the figure. In the type of strip line-waveguide transition illustrated in FIG. 3, the probe is the conductor 38, for example, and the ground plate serves as the short circuit termination for the waveguide. The distance between the conductor 38 and the ground plate 42 is preferably determined by other considerations, such as suppressing unwanted modes of transmission in the strip line, so that the parameter L is fixed and not available to be varied to effect impedance matching. In place of the parameter L, the slot 86 is provided. The slot functions as a capacitive iris. The spacing between the iris and the probe is also a fixed amount, determined by the spacing between the strip and the ground plate. The resulting configuration may be optimized experimentally to obtain a minimum coupling loss and a maximum bandwidth of transmission. The location of the capacitive iris in the ground plate relative to the adjacent waveguide section is shown in FIG. 2, where the iris 118 is shown in relation to the waveguide section 36, in an exploded view.

Figure 6:
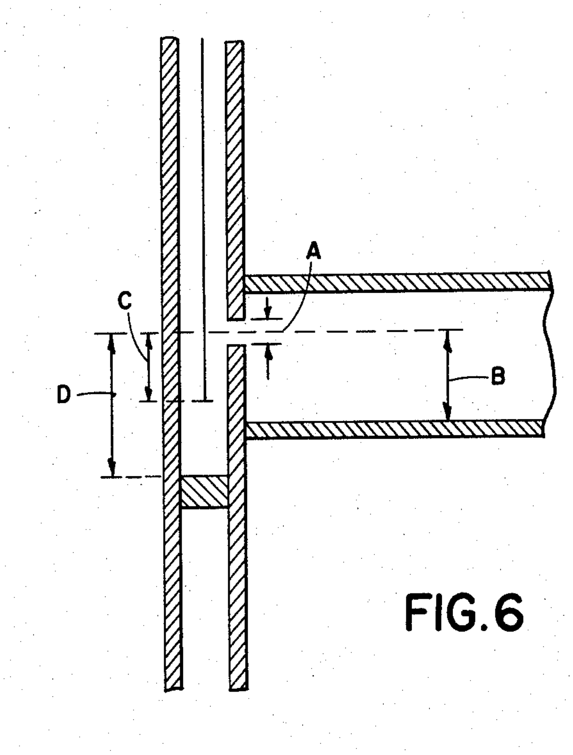
FIG. 6 is a diagram showing parameters of a strip line to waveguide transition of a type compatible with the embedding of a waveguide in a stack of circuit planes.

The geometrical relationship between various parameters in the type of strip line-waveguide transition used herein and described above is shown in FIG. 6, in which the orientation of strip line and waveguide is the same as the orientation of TEM-structure and waveguide in FIG. 5 for ready comparison. In FIG. 6, parameter A is the height of the capacitive iris, B is the height of the middle of the iris above the floor of the waveguide, C is the distance that the probe penetrates below the middle of the iris, and D is the distance of the reflector from the middle of the iris. The effect of the probe upon the waveguide as viewed through the iris is inductive. This inductive effect may be tuned out by selecting a suitable height A for the iris, which as a practical matter makes the parameter A the most effective parameter in securing an impedance match. The parameter B, determining the position of the iris has an optimum value at any particular frequency of operation, which value may be found experimentally by moving the waveguide up and down with respect to the iris. The penetration C of the probe is not very sensitive to frequency and an optimum value may be obtained experimentally. Parameter D is the second most effective parameter for impedance matching. A suitable procedure for impedance matching is to first vary A with arbitrary settings of B, C and D, to obtain minimum transition loss and maximum bandwidth. Then, D may be varied, keeping A, B and C constant. Thereafter, B and C may be adjusted slightly, and finally, D may be readjusted for optimum circuit performance. More simply, after A is determined, the waveguide and the reflector may be moved as a unit, thereby changing D and B simultaneously to obtain an optimum setting, without appreciable detriment to the result.

In order to avoid coupling losses due to near field effects, it is desirable to make each run of waveguide at least a half wavelength long, which may rule out a direct coupling between two adjacent circuit planes or couplings running through only one or two intermediate circuit planes. However, the stacking of the circuit planes usually may be arranged in such order that several circuit planes intervene between each two that are to be connected, as in FIG. 4, wherein it will be seen that the first plane is not directly connected to the second plane, but the connection runs from the first to the sixth and from the sixth to the second. By an obvious extension of the type of connecting scheme shown by waveguides 108, 110 and 112 in FIG. 4, a circuit connection may be run through each plane of a given stack in the required order, each plane being inserted in its proper position in the stack.

Figure 7:
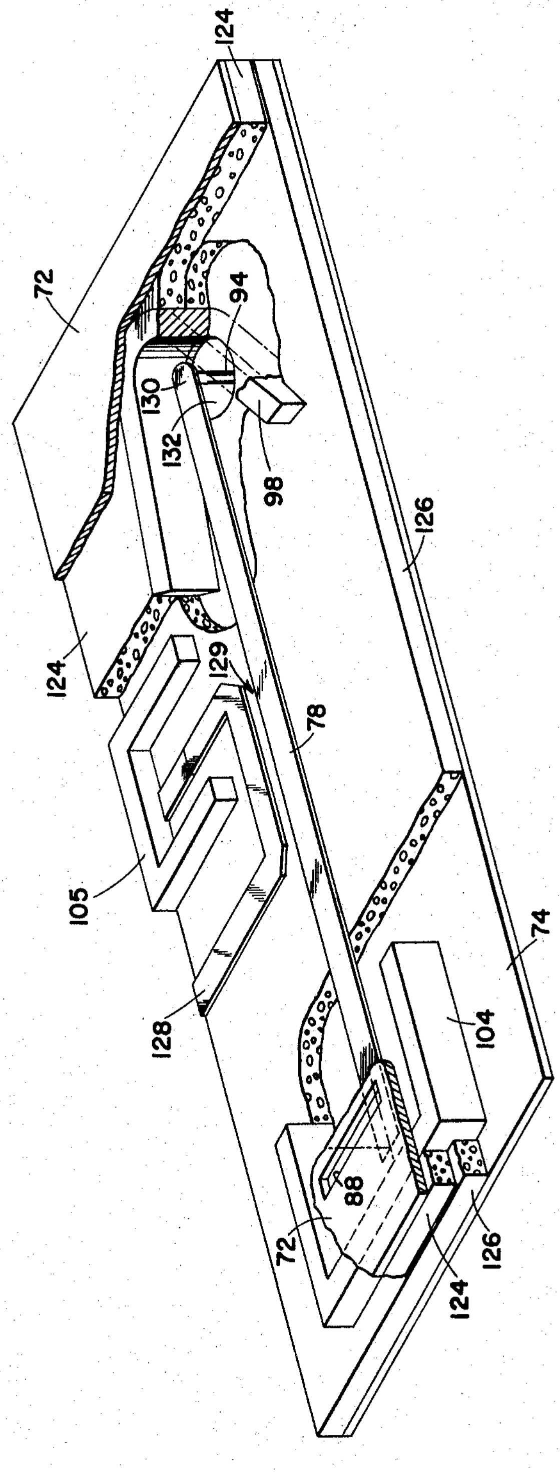
FIG. 7 is a fragmentary perspective view showing certain details of coaxial line to strip line and strip line to waveguide transitions.

FIG. 7 shows illustrative details of the strip line-waveguide transition and of an output connection. With suitable substitution of reference numerals the figure equally well represents the strip line-waveguide transition together with an input connection. The figure shows the bottom circuit plane illustrated in FIG. 3 of the drawing, mainly broken away, viewed from above the upper ground plate 72. The figure illustrates a preferred strip line structure in which the layer 76 comprises upper and lower laminations 124 and 126, respectively. The conductor 78 is secured to the upper surface of the lower lamination 126 by a metal to insulation bond. Any desired circuit configuration may be fabricated from a metal sheet or foil which initially covers the entire upper surface of the lower lamination and then is partially etched away or otherwise partially removed leaving only strips such as 78 and 128 and a coplanar directional coupler 129 intercoupling the strips 78 and 128 to form the desired circuit configuration. The upper end of the strip 78 connects at point 130 to the inner conductor 94 through a circular hole 132 in plate 74 of the same diameter as the inner bore of the outer coaxial structure 96 (FIG.3). The transition member 98 serves as a matching element or reflector between the coaxial structure and the strip line, being curved to fit the circumference of the hole 132 over about half the circumference and then gradually spreading out to at least the minimum effective width of the strip line. The thickness of the member 98 is just the desired spacing between ground plates 72 and 74. The member 98, the reflector 104, and the reflector 105 of the directional coupler 129, which are of the same thickness, are all fastened to both plates 72 and 74 in any suitable manner. The slot 88 is shown in the plate 72, transverse to and above the lower portion of the strip 78. The reflector 104 is spaced from the center of the slot 88 according to the value of the parameter D (FIG. 6).

For operation in the X band and more particularly at a frequency around 9 kilomegacycles per second, a suitable waveguide is a rectangular hollow pipe of outside dimensions 1.000 inch by 0.500 inch and inside dimensions 0.900 inch by 0.400 inch. A suitable strip line is composed of copper ground plates 0.048 inch thick spaced apart 0.118 inch, with copper strip or foil 0.152 inch wide and 0.002 inch thick supported upon a foam type insulating lamination approximately 0.059 inch thick. For operation at 9 kilomegacycles per second, a capacitive coupling iris between waveguide and strip line measuring 0.900 inch by 0.120 inch has been used.

The maximum appreciable spread of the field of a strip line laterally between the ground plates is approximately the width of the strip plus twice the spacing between the ground plates. In the case of the strip line with the dimensions given above, the spread is about 0.388 inch, which value constitutes the minimum lateral center to center spacing of uncoupled adjacent strips in a given circuit plane. Where coupling between strips is desired, as in directional coupler 129, smaller lateral spacings are utilized. The total thickness of the sandwich-type circuit plane composed of this strip line is about 0.214 inch.

It will be understood that while a form of strip line circuit employing two ground plates has been described herein, the invention is also applicable to a strip line circuit employing a single ground plate. Thus for example if the top ground plate for each circuit plane is omitted, the waveguide sections may have their upper ends flush with the upper surface of the upper dielectric lamination. The circuit planes may then be stacked, with the waveguide sections in registered relationship.

In some cases, the upper dielectric lamination may also be omitted, and the waveguide sections (welded or brazed to the lower ground plate) may extend upwardly far enough so that their upper portions serve to provide a desired spacing between the strip and the ground plate next above it.

While an illustrative form of apparatus in accordance with the invention has been described and shown herein, it will be understood that numerous changes may be made without departing from the general principles and scope of the invention.

What is claimed is:

1. In a strip line transmission system, in combination, a plurality of strip line circuit planes in stacked array, each said circuit plane including at least one conductive strip embedded in a dielectric filling between a pair of ground plates and having a slot in such position that the slots in adjacent planes are in alignment providing a continuous passage through said plurality of circuit planes, a section of waveguide of length equal to the thickness of said circuit plane attached to each said circuit plane, whereby a plurality of said waveguide sections cooperate to form the electrical equivalent of a continuous waveguide extending through said continuous passage, and means coupling said resultant effective waveguide to at least one of said circuit planes.

2. In a strip line transmission system, in combination, a plurality of strip line circuit planes in stacked array, a succession of adjacent ones of said planes each having a slot therein in such position that the slots in adjacent planes are in alignment providing a continuous passage through said succession of adjacent circuit planes, a section of waveguide of length equal to the thickness of one said circuit plane embedded in each said circuit plane of said succession of adjacent circuit planes, whereby said waveguide sections cooperate to form the equivalent of a continuous waveguide extending through said continuous passage, at least one additional circuit plane adjacent said succession of planes on each side of said succession, and means coupling each end section of waveguide to the adjacent circuit plane beyond the end of said succession.

3. In a strip line circuit, in combination, a plurality of circuit planes in stacked array, each said circuit plane including at least one conductive strip embedded in a dielectric filling between a pair of ground plates, a succession of adjacent ones of said circuit planes each having a slot therein in such position that the slots in adjacent planes are in alignment providing a continuous passage through said succession of adjacent circuit planes, at least one additional circuit plane adjacent said succession of circuit planes on each side of said succession, a hollow-pipe waveguide extending through said continuous passage from one said additional circuit plane to another on opposite sides of said succession of circuit planes, the ground plate of a said additional circuit plane adjacent to said waveguide having an opening therein into said waveguide, said last-mentioned additional circuit plane having a conductive strip extending past said opening and terminating beyond and in the immediate neighborhood of said opening, and a reflector connecting the ground plates of said last-mentioned additional circuit plane and spaced apart from the terminating end of said conductive strip.

4. In a stacked assemblage of circuit planes, a hollow pipe waveguide connection effective between first and second circuit planes of said assemblage, which first and second circuit planes are separated in the assemblage by a distance too small for effective direct hollow pipe waveguide connection, in combination, a third circuit plane in said assemblage, said assemblage including circuit planes in sufficient number and so arranged that the distance through the assemblage from said third circuit plane to each of said first and second circuit planes is great enough in each case to permit effective connection by means of a single hollow pipe waveguide, a plurality of said circuit planes having aligned apertures forming a first passage from said third circuit plane to said first circuit plane and a second passage from said third circuit plane to said second circuit plane, a first hollow pipe waveguide connection extending through the aligned apertures in said first passage between said first and third circuit planes, and a second hollow pipe waveguide connection extending through aligned apertures in said second passage between said second and third circuit planes, whereby an effective hollow pipe waveguide connection is established between said first and second circuit planes by the combination of said first and second hollow pipe waveguide connections.

5. In a stacked assemblage of circuit planes, in combination, a plurality of circuit planes embodying circuit components, each said circuit plane having a slot therein in such position that the slots in adjacent planes are in alignment providing a continuous passage through said plurality of circuit planes, a section of waveguide of length equal to the thickness of said circuit plane attached to each said circuit plane and positioned in the said slot therein, whereby a plurality of said waveguide sections cooperate to form the electrical equivalent of a continuous waveguide extending through said continuous passage, and means coupling said resultant effective waveguide to a circuit component in at least one of said circuit planes.

References Cited in the file of this patent

UNITED STATES PATENTS

| | | |
|---|---|---|
| 2,066,876 | Carpender et al. | Jan. 5, 1937 |
| 2,872,391 | Hauser et al. | Feb. 3, 1959 |

FOREIGN PATENTS

| | | |
|---|---|---|
| 156,685 | Australia | May 22, 1954 |
| 307,826 | Switzerland | Aug. 16, 1955 |

OTHER REFERENCES

Electronics Engineering Edition, August 15, 1958, page 102.

Bland et al.: Coax to Stripline Transition, IBM Technical Disclosure Bulletin, vol. 3, No. 4, September 1960, pp. 22 and 23.